Feb. 3, 1970    H. H. ALBRO    3,493,206
ADJUSTABLE PIPE HANGER
Filed April 25, 1968    2 Sheets-Sheet 1
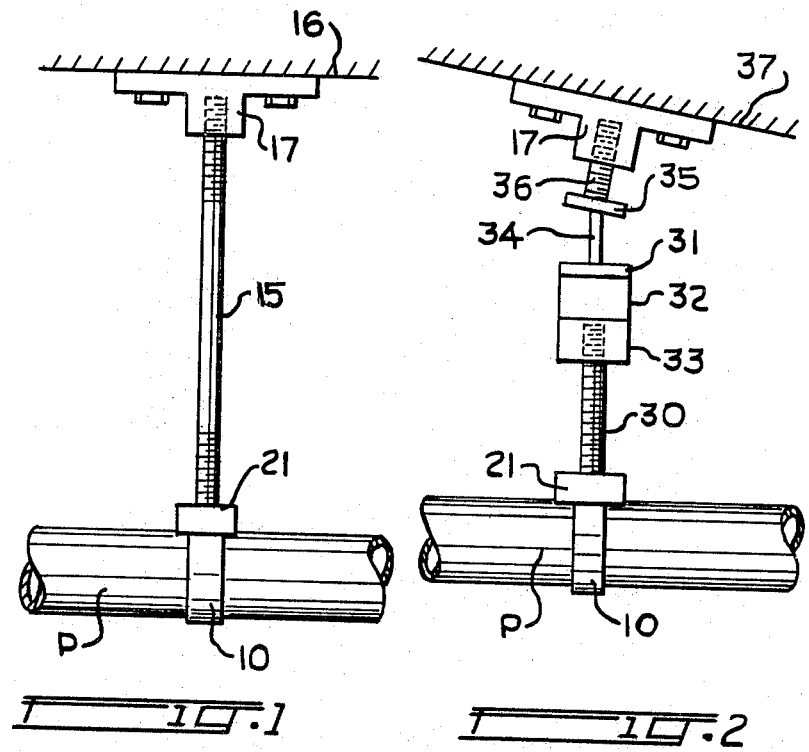
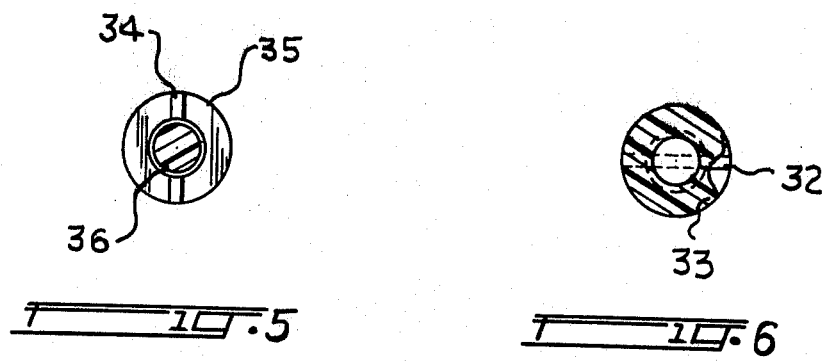
INVENTOR
HENRY H. ALBRO
BY  W. E. Sherwood
ATTORNEY

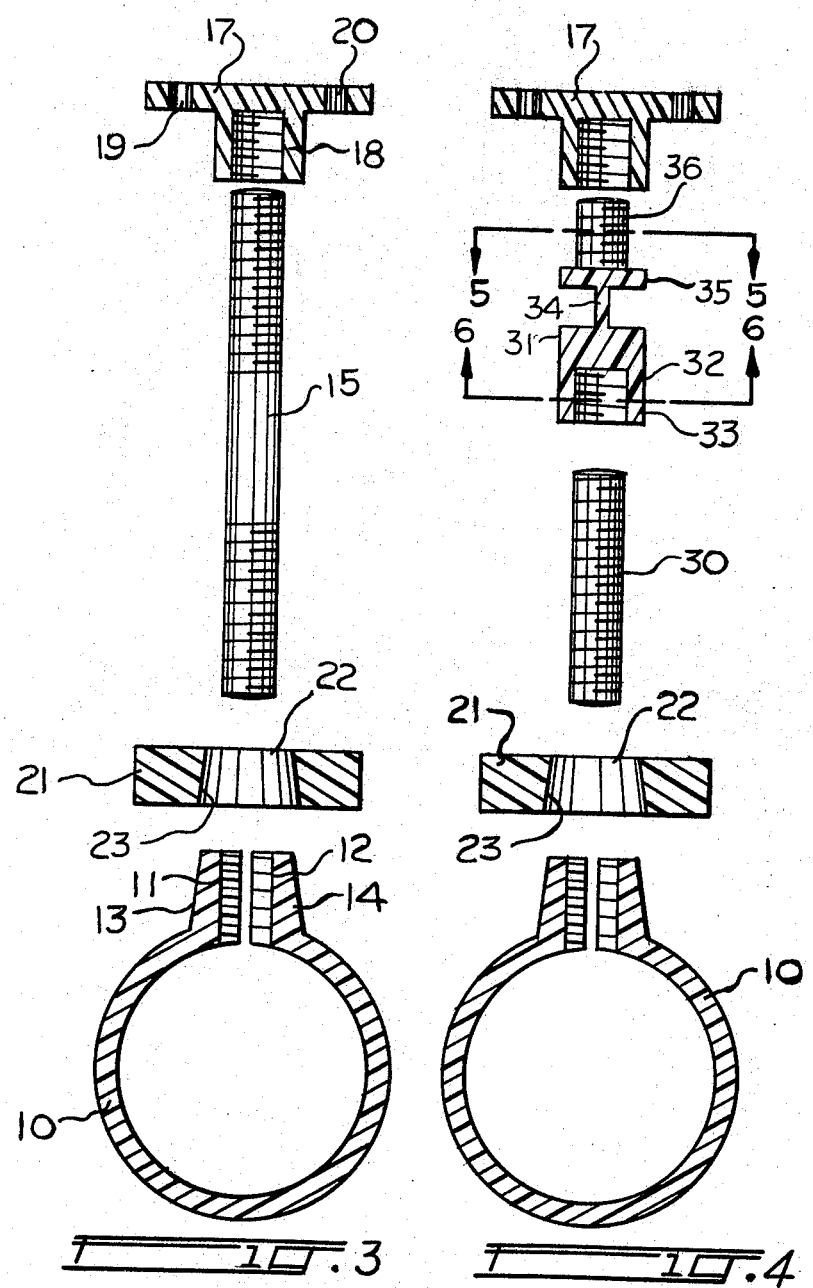

United States Patent Office 3,493,206
Patented Feb. 3, 1970

3,493,206
ADJUSTABLE PIPE HANGER
Henry H. Albro, Louisville, Ky., assignor to Cabot Corporation, Boston, Mass., a corporation of Delaware
Filed Apr. 25, 1968, Ser. No. 724,008
Int. Cl. F16l 3/00; E21f 17/02
U.S. Cl. 248—59                                  6 Claims

ABSTRACT OF THE DISCLOSURE

An adjustable pipe hanger employs a split cradle embracing the pipe and having its ends merging into interiorly threaded bosses with which one end of a threaded spacer engages. The bosses have frusto semi-conical outer surfaces against which a frusto conical inner wall of a keeper engages to hold the cradle and spacer in contact. The other end of the spacer is attached to a means for supporting the hanger.

BACKGROUND OF THE INVENTION

This invention relates to the art of mounting pipes, cables or other elongated articles suspended from a suitable supporting surface, and to an improved adjustable pipe hanger which can be assembled at the point of installation and without the employment of special tools. The invention is particularly suited for use with plastic pipe and with a hanger formed of plastic material.

As contrasted with a plastic hanger of the type shown by Willert et al. Patent No. 3,273,837, no bonding of the several parts is required, and as contrasted with the teachings of the Siver Patent No. 544,631 and Fitzpatrick Patent No. 1,924,353, an improved keeper for holding the parts at their selected location is provided in the combination of structure to the end that assembly or disassembly of the same may be quickly and easily accomplished.

One of the time consuming tasks encountered when piping with a certain flow gradient is to be installed, using pipe hangers attached to a horizontal support, involves the use of spacers of differing length and the secure attaching of the ends of the spacers to their adjoining parts. Many proposals have been made as to the use of threaded means for modifying the effective length of such spacers in a pipe hanger assembly, but, in general, to the best of my knowledge, all such proposals have still required a time consuming method of installation. In some instances special tools requiring manipulation in awkward positions are involved. It is these and other disadvantages of the prior art which it is a purpose of this invention to overcome.

SUMMARY OF THE INVENTION

The adjustable pipe hanger of the invention includes a split cradle within which a pipe is held and to which one end of an elongated spacer is threadedly attached. The cradle includes sloping surfaces against which mating surfaces of a keeper surrounding the junction of the spacer and cradle, are held in tight contact. The other end of the spacer is threadedly engaged with a suitable means, such as a plate, attaching the hanger to a support. The invention also comprehends the attachment of that other end of the spacer to a swivel-like member and the attachment of the swivel-like member in turn to the means which attaches the hanger to the support.

Preferably, the parts of the pipe hanger are made of plastic and are adapted to be assembled at the point of installation. Among the objects of the invention are the provision of a strong, lightweight pipe hanger having a threaded spacer whose effective length can be readily modified at the time of assembly; a pipe hanger having a fastening means in the form of a keeper which can be driven tightly into holding position by a blow from a simple tool; and a pipe hanger incorporating a swivel-like member permitting attachment of the hanger to a non-horizontal support without requiring additional labor.

The objects of the invention will become more apparent as the description proceeds and when considered in conjunction with the accompanying drawings in which:

FIG. 1 is a view showing the pipe hanger mounted from a horizontal surface such as a ceiling.

FIG. 2 is a view showing a modified form of the pipe hanger mounted from a non-horizontal surface.

FIG. 3 is an exploded view of the pipe hanger of FIG. 1 with certain of the parts shown in section.

FIG. 4 is an exploded view of the pipe hanger of FIG. 2 with certain of the parts shown in section.

FIG. 5 is a sectional view taken on line 5—5 of FIG. 4, and

FIG. 6 is a section view taken on line 6—6 of FIG. 4 and partly broken away.

DESCRIPTION OF THE PREFERRED EMBODIMENTS

Referring first to FIG. 3, a split cradle member 10 which, for example, may be formed of a plastic material such as Type 1 polyvinyl chloride, is provided with an inner diameter which when the hanger is installed to support pipe P will afford a suitable clearance for such pipe. The end portions of the cradle merge into a pair of complementary shaped bosses, 11 and 12, which project laterally and which partake of the shape of semi-conical truncated members having uniformly sloping exteriors 13, 14 with the smallest diameter at the outer ends of such bosses.

These bosses are axially threaded on their interiors and with a thread matching that of the spacer 15 now to be described. This spacer, which may be of rod or tube form, preferably is helically threaded throughout its entire length which, for example, may be a foot or more, and preferably is formed of a plastic material which can be readily cut to a desired length with a simple tool at the point of installation. The upper end of the spacer is adapted to be threadedly engaged with a means for attaching the hanger to a support such as a ceiling structure 16. Such means, for example, may comprise a plate 17 having an interiorly threaded boss 18 and with holes 19, 20 through which screws or the like may be passed.

A fastening means for holding the described parts in assembled relation as seen in FIG. 1 comprises a keeper 21 having a central axial aperture 22 therein and preferably formed of a plastic material. This aperture has an inner wall in the form of a truncated generally conical surface 23 which mates with the exterior surfaces 13, 14 of the bosses of the cradle when the hanger is assembled.

Depending upon the coefficients of friction of the particular materials employed and the amount of contacting surfaces between the keeper and the bosses of the cradle the slope of the described conical surfaces may vary without departing from the invention. However, an angle in the range of about 3° to 15° is preferred.

Accordingly, in practicing the invention, the artisan may employ the following simple method of installing the hanger. First he determines the distance at which pipe P is to be suspended beneath the support 16 and cuts the spacer 15 to proper length, if it is not already of proper length. The pipe is inserted within the cradle and the lower end of the spacer, with the keeper in surrounding relation thereto, is engaged with the threads of the bosses. Thereafter the keeper is driven downwardly with a blow from a suitable tool and forces the bosses 11 and 12 toward each other and meanwhile locks the spacer to the cradle. The plate 17 is then screwed upon the upper end of the spacer and the assembly is raised to the position at which plate 17 is fixed to support 16.

As will be apparent, the threaded sockets in both the bosses of the cradle and in the plate 17 have sufficient depth to provide appreciable adjustment lengthwise of the parts engaging therewith thus to adjust the distance of the pipe P from the supports 16 or 37 to the extent desired.

In the use of pipe hangers in certain situations a requirement exists for a resilient or swiveled hanger and the present invention is likewise suited for such uses. For example, when a non-rigid mounting of the pipe, or when the mounting of the pipe upon a non-horizontal support is desired by the user, the modification shown in FIG. 4 may be employed. In this combination, the split cradle, the keeper, and the support plate may be employed as above described but a shorter threaded spacer 30 is used in conjunction with a member herein called a swivel-like member, comprising a tough, resilient material and having sufficient strength and flexibility and constructed so as to provide a swivel action. This swivel member preferably is formed of a plastic material, for example, polypropylene, having a modulus of elasticity suitable to provide the desired swivelling action.

As shown in FIGS. 4 to 6, the swivel-like member includes a central horizontal disc portion 31 with a depending generally flat web 32 to the bottom of which is attached an integral hub portion 33 having an axially bored threaded recess for engagement with the upper end of the short spacer 30. Extending upwardly from the disc portion 31, and displaced to a position at right angles to the lower web 32, is a generally flat web 34 to the top of which is integrally attached an upper disc portion 35. This upper disc portion in turn is integrally attached to cylindrical boss 36 which is provided with an exterior thread for engagement in the recess within the mounting plate 17.

Referring now to FIG. 2, when the artisan desires to mount the pipe hanger upon a sloping ceiling 37, the following assembly procedure may be used. First, a proper length of spacer 30 is engaged with the cradle and the keeper is driven into place as above described. Then the hub of the swivel-like member is attached to the upper end of the spacer 30 so that the web 34 will occupy the desired plane for deflection. Thereafter the plate 17 is attached to the upper end of the swivel-like member and the assembly is raised to the position at which plate 17 is fixed to support 37. As this affixing takes place, the web 34 is flexed as required, but the portion of the hanger beneath the swivel-like member can hang in a vertical plane.

In each of the described uses of the invention, cradles of varying diameters to accommodate different sizes of pipes may be used without requiring modification of the related parts of the assembly, it being understood that the size and shape of the cradle bosses with which the keeper engages will be uniform for all sizes of such cradles.

Having thus described preferred forms of coordinated apparatus by means of which the invention is practiced, it will be understood that the invention may be embodied in other forms without departing from the scope of the invention.

What is claimed is:

1. An adjustable pipe hanger comprising a split cradle having an arcuate central portion adapted to embrace the periphery of the pipe to be supported and with end portions projecting laterally therefrom and forming a pair of complementary shaped bosses, the interiors of said bosses being axially threaded and the exteriors thereof forming truncated generally semi-conical shaped surfaces with the smallest diameter thereof at the outer ends of said bosses, an elongated spacer threaded at one end and connected at its other end to means for attaching the hanger to a support, said threaded end of said spacer being engaged by the threaded interiors of said bosses, and fastening means comprising a keeper encompassing said bosses and having a truncated generally conical interior surface adapted to be forced with a tight fit against the mating exterior surfaces of said bosses of said cradle, thereby to hold said bosses in engagement with the threaded end of said spacer while the pipe is being supported.

2. A pipe hanger as defined in claim 1 wherein said cradle and said keeper comprise plastic materials.

3. A pipe hanger as defined in claim 1 wherein the angle of said mating conical surfaces is within the range of 3° to 15°.

4. An adjustable pipe hanger comprising a split cradle having an arcuate central portion adapted to embrace the periphery of the pipe to be supported and with end portions projecting laterally therefrom and forming a pair of complementary shaped bosses, the interiors of said bosses being axially threaded and the exteriors thereof forming truncated generally semi-conical shaped surfaces with the smallest diameter thereof at the outer ends of said bosses, a swivel-like member threaded at each end and adapted for engagement at a first end with threaded means for attaching the hanger to a support and at its second end for engagement with an elongated spacer, said spacer being threaded at each end and being adapted for threaded engagement at one end with the threaded interiors of said bosses and at its other end with the threaded second end of said swivel-like member, and fastening means comprising a keeper encompassing said bosses and having a truncated generally conical interior surface adapted to be forced with a tight fit against the mating exterior surfaces of said bosses of said cradle thereby to hold said bosses in engagement with the threaded end of said spacer while the pipe is being supported.

5. A pipe hanger as defined in claim 4 wherein said swivel-like member, said cradle, and said keeper comprise plastic materials.

6. A pipe hanger as defined in claim 4 wherein the material comprising said swivel-like member is polypropylene.

References Cited

UNITED STATES PATENTS

| | | | |
|---|---|---|---|
| 476,227 | 5/1892 | Dunning | 248—62 X |
| 1,870,651 | 8/1932 | Robinson et al. | 248—59 |
| 1,924,353 | 7/1933 | Fitzpatrick | 248—59 |
| 2,004,695 | 6/1935 | Hager | 248—61 |
| 2,289,995 | 7/1942 | Powers | 248—60 |
| 2,452,186 | 10/1948 | Fluharty | 248—62 X |
| 3,273,837 | 9/1966 | Willert | 248—59 |

FOREIGN PATENTS 863,044   3/1961   Great Britain.

CHANCELLOR E. HARRIS, Primary Examiner

U.S. Cl. X.R.

248—62, 327